United States Patent [19]
Frederick, Jr.

[11] Patent Number: 5,935,202
[45] Date of Patent: Aug. 10, 1999

[54] COMPRESSOR CIRCUIT IN A DATA PROCESSOR AND METHOD THEREFOR

[75] Inventor: Marlin Wayne Frederick, Jr., Austin, Tex.

[73] Assignee: International Business Machines Corporation, Armonk, N.Y.

[21] Appl. No.: 08/824,113

[22] Filed: Mar. 25, 1997

[51] Int. Cl.$^6$ .................................................. G06F 7/52
[52] U.S. Cl. ........................................................ 708/630
[58] Field of Search ................... 364/760.02–760.03, 364/786.03

[56] References Cited

U.S. PATENT DOCUMENTS

| | | | |
|---|---|---|---|
| 4,752,905 | 6/1988 | Nakagawa et al. | 364/760.02 |
| 5,181,185 | 1/1993 | Han et al. | 364/760 |
| 5,343,416 | 8/1994 | Eisig et al. | 364/757 |

OTHER PUBLICATIONS

Booth, Andrew D., "A Signed Binary Multiplication Technique," *Q.J. Mech. Appl. Math.*, 4:236–240 (1951) Oxford University Press, pp. 100–104.

Wallace, C.S., "A Suggestion for a Fast Multiplier," *IEEE Trans. Electron. Comput.*, EC–13:14–17 (1964), pp. 114–117.

Dadda, L., "Some Schemes for Parallel Multipliers," *Alta Freq.*, 34:349–356 (1965), pp. 118–125.

Saunders, D.M. et al., "High–Speed Multiplier," *IBM Technical Disclosure Bulletin*, vol. 13, No. 2, Jul., 1970, pp. 546–548.

Swartzlander, Earl E., Jr., "Computer Arithmetic," *Computer Engineering Handbook*, vol. 1, Ch. 4, McGraw–Hill, Inc. (1980).

Weste, Neil H.E., et al., "Principles of CMOS VLSI Design, A Systems Perspective," *CMOS Subsystem Design*, Addison–Wesley Publishing Co., Jun., 1988, p. 314.

Sam, Homayoon et al., "Generalized Multibit Recoding of Two's Complement Binary Numbers and Its Proof with Application in Multiplier Implementations," *IEEE Transactions on Computers*, vol. 39, No. 8, Aug., 1990, pp. 1005–1014.

"Booth Muxes Interleaved with Carry Save Adders Array," *IBM Technical Disclosure Bulletin*, vol. 38, No. 7, Jul. 1995, pp. 177–178.

*Primary Examiner*—Tan V. Mai
*Attorney, Agent, or Firm*—Winstead Sechrest & Minick P.C.; Anthony V. S. England

[57] ABSTRACT

A multiplier in a data processing system has a modified compressor structure which is configured to alleviate both a tendency of the multiplier to be wire bound and to optimize a circuit area required to implement the multiplier. In the modified compressor structure, all inputs to the compressor are not of the same weight, all outputs of the compressor are not of the same weight, and carry values generated during the compression process are no longer all shifted in a same direction. Instead, in the compressor, a mixture of sum values and carry values generated during a compression process are reduced within the compressor. By modifying the compressor so that it is no longer limited to receiving only inputs having a same weight, there is a reduced input/output signal requirement and, therefore, the compressor has less global interconnect requirements. Additionally, the layout of the compressor reduces an amount of "stagger" of multiplier because the weight of the values provided by the input Booth multiplexers to the compressor are not required to be the same.

27 Claims, 8 Drawing Sheets

500
A Bit Slice of a
9:2 Compressor

COMPRESSOR CIRCUIT IN A DATA PROCESSOR AND METHOD THEREFOR

TECHNICAL FIELD

The present invention relates in general to a compressor circuit, and more particularly, to a compressor circuit in a multiplier circuit.

BACKGROUND INFORMATION

Multipliers are often essential elements in data processing systems. However, as technology has grown more complex and users have demanded that central processing units in such data processing systems perform increasingly faster functions, the size of multiplier circuits has grown and is often a significant portion of the circuit area of the central processing unit. For example, to simply meet an IEEE-754 Floating Point specification, a multiplier must be able to multiply two 53-bit inputs. A significant amount of circuit area is required to implement a multiplier which has such large inputs due to an amount logic required to implement a multiplication operation.

To improve the performance of such a multiplier, several techniques have been developed. Generally, multipliers with the desired capability have array structures or a Wallace tree structure. It should be noted that multipliers with greater area allotments and greater performance requirements often employ a Wallace tree structure. In an array multiplier or a Wallace tree implementation, a modified Booth's algorithm can be used to produce n/2 rows of m partial products in an initial step, where n is a number of bits of the multiplier operand and m is the number of bits of the multiplicand input to the multiplier. Booth's algorithm is well-known in the data processing art and was disclosed in a paper entitled "A signed Binary Multiplication Technique," published in *Q.J. Mech. Appl. Math.* 4:236–240 (1951), and published by Oxford University Press.

A modified Booth's algorithm allows two's-complement multiplication. To multiply A·B using Booth's algorithm, each of the bits of the multiplier A are examined in groups of three adjacent bits starting with a least significant bit. The following table illustrates an encoded relationship among these three bits.

| $X_{i+2}X_{i+1}X_1$ | Add to Partial Product |
|---|---|
| 000 | +0Y |
| 001 | +1Y |
| 010 | +1Y |
| 011 | +2Y |
| 100 | −2Y |
| 101 | −1Y |
| 110 | −1Y |
| 111 | −0Y |

Notice, the required multiple of the multiplicand may be easily implemented by shift and invert operations. After the encoding operation is performed, n/2 rows of partial products are added. In comparison, n rows of partial products are required by a non-Booth-recoded methodology. Thus, modified Booth encoding conserves one level of addition and reduces the area required to perform a multiplication operation in a Wallace tree multiplier. Furthermore, modified Booth encoding reduces the number of levels of addition to perform a multiplication operation in an array multiplier to n/2. Booth's algorithm is easily implemented as all multiplication operations may be implemented as simple arithmetic left shifts.

Typically, multipliers use a modified Booth's algorithm to encode data which is subsequently summed using either an array summation scheme or a Wallace tree summation scheme. When a Wallace tree scheme is utilized, the encoded information provided from Booth's algorithm can be compressed using a compressor comprised of counters. A carry save adder (CSA) is an example of 3:2 counter. Typically, the compressor is utilized to provide greater regularity to simplify a layout associated with the multiplier. For example, as previously discussed, when a floating point operation is executed and the IEEE-754 Floating Point specification must be satisfied, the multiplier must multiply two 53-bit inputs. When one of the inputs to the multiplier is Booth encoded, only 27 rows of partial products remain to be reduced by an array or tree of counters. Because 27 rows are required, typical implementations of multipliers utilize three 9:2 compressors whose outputs are then reduced by a single 6:2 compressor.

In implementing such compressors, several difficulties arise. For example, compressor implementations tend to be wire bound in the context of a multiplier and are very difficult to route on a surface of a semiconductor device. Additionally, given the structure of Wallace tree multipliers, irregular edges often result from the wiring restraints of the compressor. Such irregular edges waste valuable circuit area and increase an overhead associated with implementation of the semiconductor device.

Figure 1:
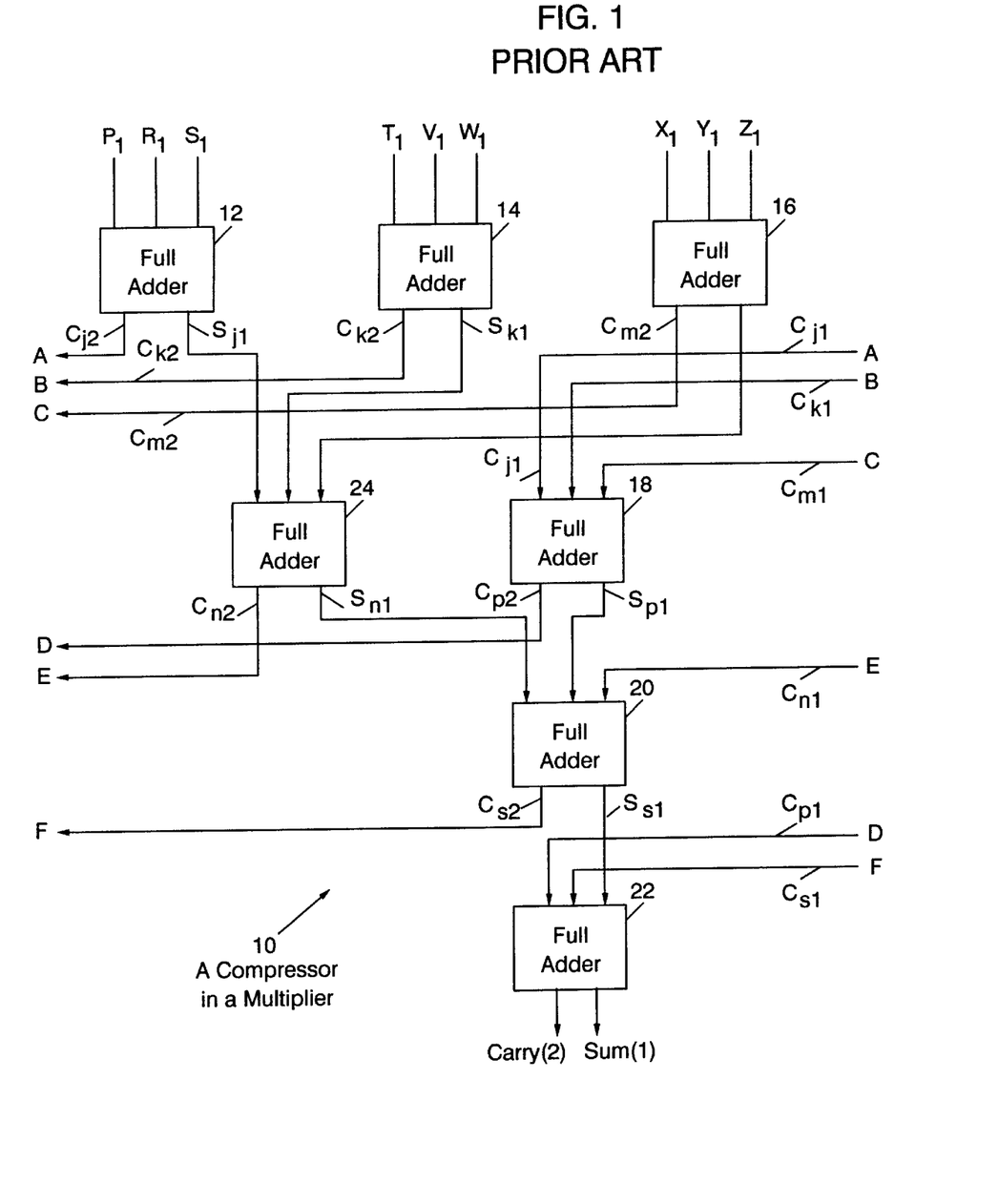
FIG. 1, illustrates, in block diagram form, a prior art embodiment of a bit slice of a 9:2 compressor.

FIG. 1 illustrates a traditional implementation of a compressor typically used to implement a Wallace tree multiplier. Compressor 10 of FIG. 1 comprises a plurality of full adders 12 through 24. Each of a first row of full adders (12 through 16) receives inputs having a same weight, where a weight corresponds to a bit position in a binary number system. Furthermore, it should be noted that all inputs to compressor 10 are a same weight. In FIG. 1, this weighting is indicated in a subscript on each of the inputs. For example, $x_1$ indicates that a bit having a weight of 1 is input by that signal. Furthermore, it should be noted that in traditional implementations of compressors, such as compressor 10, all of the inputs are a same weight and all of the outputs of a bit slice of the compressor, with the exception of a final sum bit which has the same weight as the inputs, are a next higher weight. Therefore, in FIG. 1, each of the outputs of the bit slice of a compressor 10 have a subscript "2" (with the exception of Sum (1)) to indicate that a next higher weight is being assigned to each of the outputs of the bit slice. Please note that the subscripts provided in FIG. 1 are provided to show relative weights and do not indicate that the inputs are in a first bit position and the outputs are in a second bit position. U.S. Pat. Nos. 5,181,185 and 5,343,416 provide illustrations of such traditional implementations of a compressor in a multiplier.

While the use of Booth recoding significantly reduces an amount of circuitry required to implement a multiplier and data processor, the problems and difficulties associated with that implementation described above still remain. Therefore, a need exists for a compressor implementation which minimizes an amount of required global wiring and, therefore, reduces a compressor's tendency to be wire bound in some applications. Additionally, in light of the circuit area requirements traditionally required by multipliers with Wallace tree schemes, and therefore compressors, there is a need for a compressor which makes more efficient use of the circuit area required to implement the Wallace tree multiplier.

SUMMARY OF THE INVENTION

The previously mentioned needs are fulfilled with the present invention. Accordingly, there is provided, in a first form, a compressor. The compressor includes a first circuit for receiving a first plurality of bits having a first binary weight and for providing a first sum value having the first binary weight and a first carry value having a second binary weight. The compressor also includes a second circuit for receiving a second plurality of bits having the second binary weight and for providing a second sum value having the second binary weight and a second carry value having a third binary weight. A third circuit is connected to the first circuit for receiving the first carry value and is connected to the second circuit for receiving the second sum value. The third circuit provides a third sum value having the second binary weight and provides a third carry value having the third binary weight.

Additionally, there is provided, in a second form, a data processing system having a multiplier. The multiplier includes a first Booth encoder for receiving a first portion of a first data value and for providing a first encoded data value. A first multiplexer is connected to the first Booth encoder for receiving the first encoded data value and for receiving a second data value. The first multiplexer provides a first multiplexed value. A first compressor is connected to the first multiplexer for receiving the first multiplexed value and for providing a first final sum value and a first final carry value. The first compressor includes a plurality of bit slices. Each of the plurality of bit slices includes a first circuit for receiving a first plurality of bits having a first binary weight. The first circuit provides a first sum value having the first binary weight and a first carry value having a second binary weight. Each of the plurality of bit slices also includes a second circuit for receiving a second plurality of bits having the second binary weight. The second circuit provides a second sum value having the second binary weight and a second carry value having a third binary weight. A third circuit is connected to the first circuit for receiving the first carry value and is connected to the second circuit for receiving the second sum value. The third circuit provides a third sum value having the second binary weight and provides a third carry value having the third binary weight.

Furthermore, there is provided, in a third form, a method for compressing a first data value. The method includes the steps of receiving a first plurality of bits of the first data value at a first circuit wherein each of the first plurality of bits has a first binary weight. A first sum value having the first binary weight and a first carry value having a second binary weight are generated using the first circuit. A second plurality of bits having the second binary weight is received at a second circuit. A second sum value having the second binary weight and a second carry value having a third binary weight are generated using the second circuit. The first carry value and the second sum value are received at a third circuit. A third sum value having the second binary weight and a third carry value having the third binary weight are provided using the third circuit.

These and other features, and advantages, will be more clearly understood from the following detailed description taken in conjunction with the accompanying drawings. It is important to note the drawings are not intended to represent the only forum of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides a data processing system which implements a multiplier having a modified compressor structure which is configured to alleviate both a tendency of a compressor to be wire bound and to optimize a circuit area required to implement the compressor. In the compressor of the present invention, the compressor is modified so that all inputs to the compressor are not of the same weight, all outputs of the compressor are not of the same weight, and carry values generated during the compression process are no longer all shifted in a same direction. Instead, in the compressor of the present invention, a mixture of sum values and carry values generated during a compression process are reduced within the compressor. By modifying the compressor so that it is no longer limited to receiving only inputs having a same weight, there is a reduced input/output signal requirement in the present invention and, therefore, the compressor has less global interconnect requirements. Additionally, the layout of the compressor of the present invention reduces an amount of "stagger" of the multiplier because the weight of the values provided by the input Booth multiplexers to the compressor are not required to be the same. Before describing the present invention in greater detail, a system environment in which the compressor is implemented will be described in greater detail.

Description of Connectivity

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
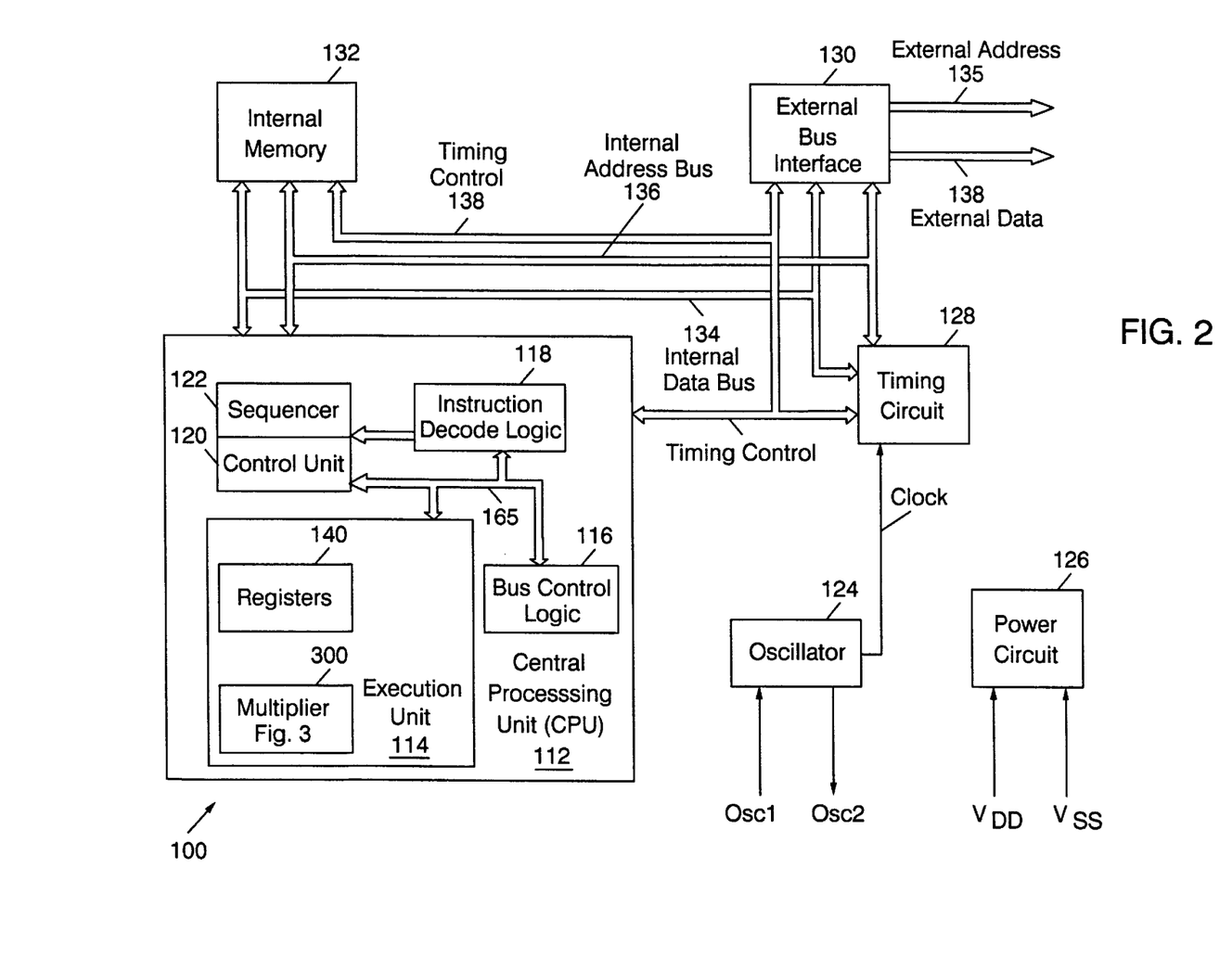
FIG. 2 illustrates, in block diagram form, an embodiment of a data processing system in accordance with the present invention.

One implementation of the compressor and a multiplier in which it may be implemented is illustrated in FIG. 2. FIG. 2 illustrates a data processing system 100 in which the multiplier and compressor may be implemented. Data processing system 100 generally comprises central processing unit (CPU) 112, and oscillator 124, a power circuit 126, a timing circuit 128, an external bus interface 130, and an internal memory 132. CPU 112 generally comprises an execution unit 114, a bus control logic circuit 116, an instruction decode logic circuit 118, a control unit 120, and a sequencer 122. Execution unit 114 comprises a plurality of registers 140 and a multiplier 300.

During operation, a "OSC 1" signal is provided to oscillator 124 via an external source, such as a crystal. The crystal is connected between the OSC 1 and OSC 2 signals to enable the crystal to oscillate. The OSC 1 signal provides a "clock" signal to a remaining portion of a data processing system 100. Operation of a crystal oscillator is well-known in the data processing art and should be apparent to one with ordinary skill in the art.

Similarly, power circuit 126 receives both a VDD and a VSS signal from an external power source. The VDD signal provides a potential voltage and the VSS signal provides a reference, or ground voltage. The VDD and VSS signals are provided to each of the remaining components of data processing system 100. The routing of each of these signals is well-known in the data processing art and should be obvious to one of ordinary skill in that art.

Timing circuit 128 receives the Clock signal and subsequently provides appropriate timing signals to each of CPU 112, external bus interface 130, and internal memory 132 via a Timing Control bus 138.

A plurality of address values are provided from external bus interface 130 via External Address bus 135. Similarly, a plurality of data values are communicated to external bus interface 130 via an External Data Bus 133. External bus interface 130 functions to communicate address and data values between an external user and data processing system 100. A plurality of address and data values are communicated between external bus interface 130 and a remaining portion of data processing system 100 via an Internal Address bus 136 and an Internal Data bus 134, respectively. Internal memory 132 functions to store information values necessary for the proper operation of data processing system 100. Additionally, other data values may be stored therein as specified in a user program.

CPU 112 executes each of the instructions required during operation of the data processing system 100. Internal Address bus 136 and Internal Data bus 134 communicate information between execution unit 114 and a remaining portion of data processing system 100. Bus control logic 116 fetches instructions and operands. Each of the instructions and operands has been decoded by instruction decode circuit 118 and provided to control unit 120 and sequencer 122. Control unit 120 and sequencer 122 maintain a sequence of execution of each of the instructions to most efficiently utilize the computing capabilities of data processing system 100. Additionally, control unit 120 includes circuitry for providing a plurality of control information to each of execution unit 114, bus control logic 116, and instruction decode logic 118 via a bus 165.

Execution unit 114 comprises, among many other circuits not illustrated herein but well-known to those with skill in the data processing art, a plurality of registers 140 and a multiplier 300.

Figure 3:
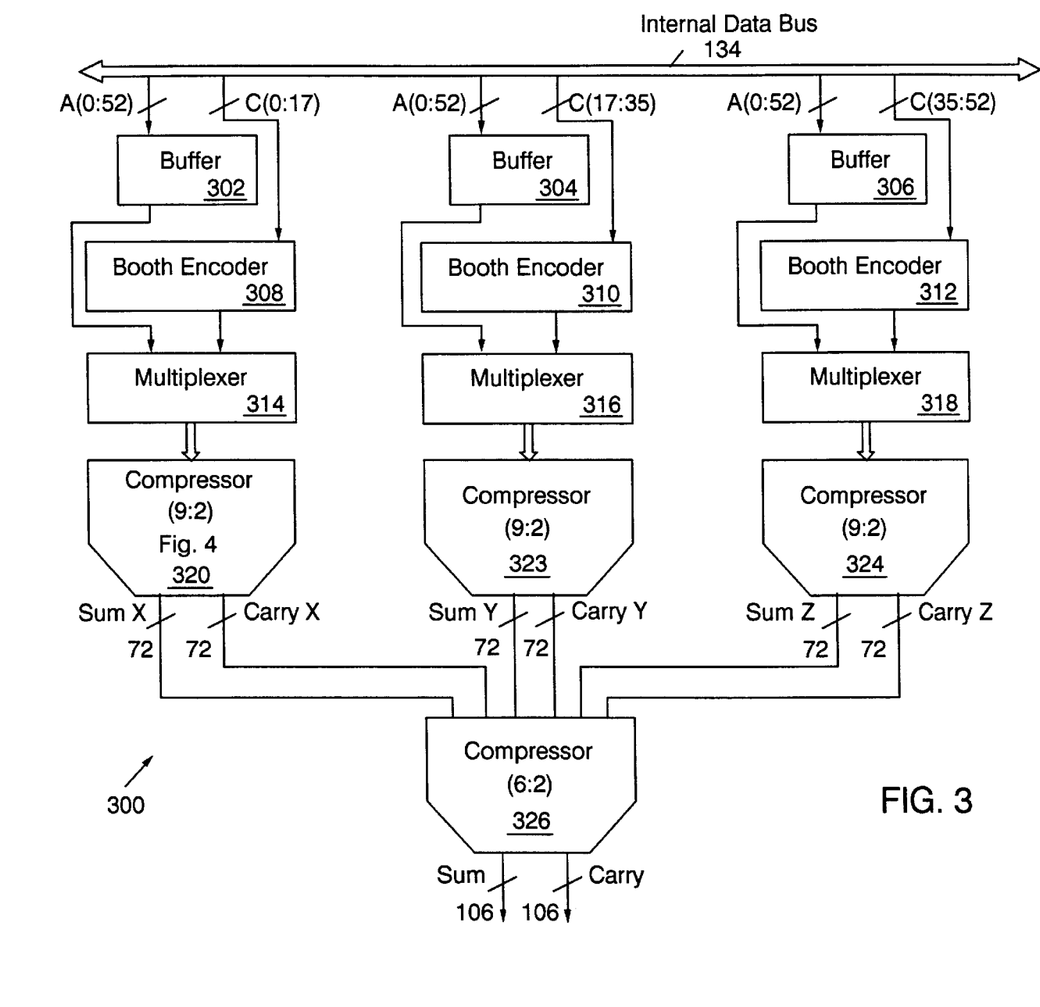
FIG. 3 illustrates, in block diagram form, a multiplier of the data processing system of FIG. 1.

Multiplier 300 is illustrated in greater detail in FIG. 3. Multiplier 300 comprises a buffer 302, a buffer 304, a buffer 306, a Booth encoder 308, a Booth encoder 310, a Booth encoder 312, a multiplexer 314, a multiplexer 316, a multiplexer 318, a compressor 320, a compressor 323, a compressor 324, and a compressor 326. Internal data bus 134 is coupled to each of buffer 302, buffer 304, buffer 306, Booth encoder 308, Booth encoder 310, and Booth encoder 312 to provide a plurality of data values. In a description of the present invention, a plurality of data values may be transferred to various components of the data processing system 100 of the present invention. In denoting that a plurality of data values are provided, a format of x(y:z) will be used. It should be noted that the value "x" indicates a data signal which is being provided, the value y indicates a first bit being transferred, and a value z indicates a last bit being transferred. Furthermore, it should be noted that while specific bit values are provided in the multiplier illustrated herein, other bit values may easily be implemented in the data processing system, the multiplier and the compressor of the present invention.

Internal data bus 134 is coupled to buffer 302 to provide an A(0:52) signal and is coupled to Booth encoder 308 to provide a C(0:17) signal. Furthermore, internal data bus 134 is coupled to buffer 304 to provide the A:(0:52) signal and is coupled to Booth encoder 310 to provide a C(17:35) signal. Internal data bus 134 is also coupled to buffer 306 to provide the A(0:52) signal and coupled to Booth encoder 312 to provide a C(35:52) signal. Buffer 302 is coupled to multiplexer 314. Booth encoder 308 is coupled to multiplexer 314. Multiplexer 314 is coupled to compressor 320. Similarly, buffer 304 and Booth encoder 310 are coupled to multiplexer 316. Multiplexer 316 is coupled to compressor 322. As well, buffer 306 and Booth encoder 312 are coupled to multiplexer 318. Multiplexer 318 is coupled to compressor 324. Compressor 320 is coupled to compressor 326 to provide a sum X signal and carry X signal. Compressor 322 is coupled to compressor 326 to provide a sum Y signal and a carry Y signal. Additionally, compressor 324 is coupled to compressor 326 to provide a sum Z signal and a carry Z signal. Compressor 326 provides a Sum signal and a Carry signal. It should be noted that in the embodiment of the invention described above, the sum X, carry X, sum Y, carry Y, sum Z and carry Z signals are each 72 bits wide. It should be noted, however, that signals having more or less bits may also be implemented using the multiplier of the present invention. Such modifications are well-known to those with skill in the art and will not be described in detail herein. Similarly, the Sum and Carry signals provided by compressor 326 are each 106 bits wide. Again, however, it should be noted that other bit widths could be easily implemented.

Figure 4:
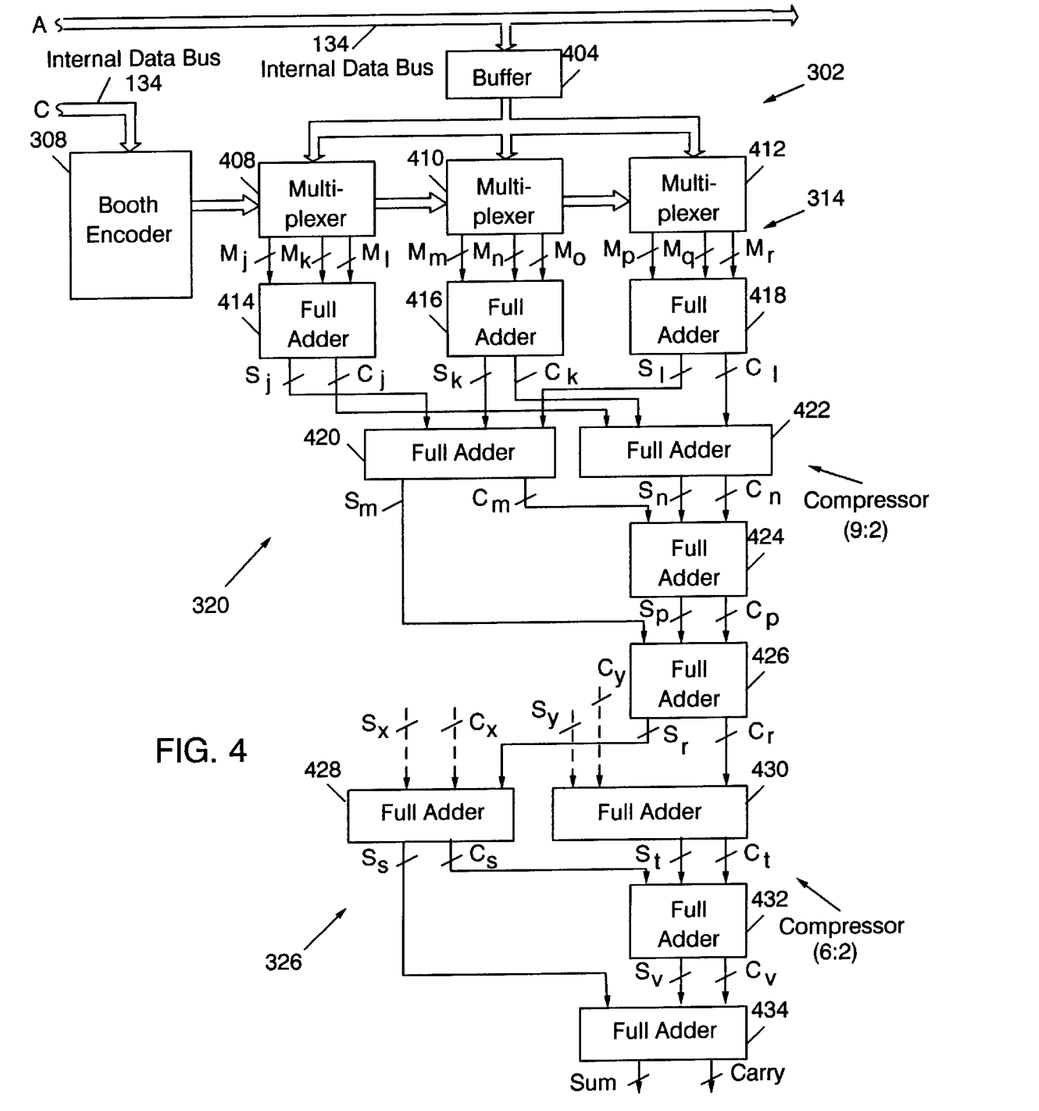
FIG. 4 illustrates, in block diagram form, an embodiment of a 9:2 compressor of the multiplier of FIG. 3.

FIG. 4 illustrates a section of multiplier 300 in greater detail. It should be noted that the illustrated section corresponds to a "branch" of the Wallace tree multiplier 300 implemented in one embodiment of the present invention. In FIG. 4, buffer 404 comprises a portion of buffer 302 of FIG. 3. Similarly, multiplexers 408, 410, and 412 of FIG. 4 comprise a portion of multiplexer 314 of FIG. 3. In FIG. 4, a portion of Internal Data bus 134 is coupled to Booth encoder 308 and buffer 404. Buffer 404 is coupled to multiplexer 408, multiplexer 410, and multiplexer 412. Booth encoder 308 is also coupled to each of multiplexer 408, multiplexer 410 and multiplexer 412. Multiplexer 408 is coupled to full adder 414 to provide multi-bit signals respectively labeled $M_j$, $M_k$, and $M_l$. Additionally, multiplexer 410 is coupled to full adder 416 to provide an $M_m$, an $M_n$, and an $M_o$ signal. Furthermore, multiplexer 412 is coupled to full adder 418 to provide an $M_p$, an $M_q$, and an $M_r$ signal. It should be noted that each of the signals provided by multiplexers 408, 410, and 412 has multiple bits. In one implementation of the present invention, each of these signals has approximately 53 bits.

Full adder 414 is coupled to full adder 420 to provide an $S_j$ signal. Full adder 414 is coupled to full adder 422 to provide a $C_j$ signal. Full adder 416 is coupled to fill adder 420 to provide an $S_k$ signal. Full adder 416 is coupled to full adder 422 to provide a $C_k$ signal. Full adder 418 is coupled to full adder 420 to provide an $S_l$ signal. Full adder 418 is coupled to fill adder 422 to provide an $C_l$ signal. Full adder 420 is coupled to full adder 424 to provide an $C_m$ signal. Full adder 420 is coupled to fill adder 426 to provide an $S_m$ signal. Full adder 422 is coupled to full adder 424 to provide an $S_n$ and $C_n$ signals. Full adder 424 is coupled to fill adder 426 to provide an $S_p$ signal and a $C_p$ signal. It should be noted that full adder 414, full adder 416, full adder 418, full adder 420, full adder 422, fill adder 424, and full adder 426 comprise a portion of compressor 320.

Inputs from each of the plurality of 9:2 compressors (320, 323, and 324) are provided to a 6:2 compressor 326 in one embodiment of the present invention. A portion of compressor 326 is illustrated in FIG. 4 and is comprised of full adder 428, full adder 430, full adder 432, and full adder 434. The signals represented by $S_x$, $C_x$, $S_y$, and $C_y$ represent carry and sum signals coming from other 9:2 compressors implemented in multiplier 300 of the present invention, but not illustrated in FIG. 4. An $S_x$ and $C_x$ signal are each received a full adder 428. Additionally, full adder 426 is coupled to full adder 428 to provide an $S_r$ signal. Full adder 426 is also coupled to full adder 430 to provide a $C_r$ signal. Additionally, an $S_y$ signal and a $C_y$ signal are also provided to full adder 430. Full adder 428 is coupled to full adder 432 to provide a $C_s$ signal. Full adder 430 is coupled to full adder 432 to provide an $S_t$ and $C_t$ signal. Full adder 428 is coupled to full adder 434 to provide an $S_s$ signal. Full adder 432 is coupled to fill adder 434 to provide an $S_v$ and a $C_v$ signal. Full adder 434 provides a Sum signal and a Carry signal.

Figure 5:
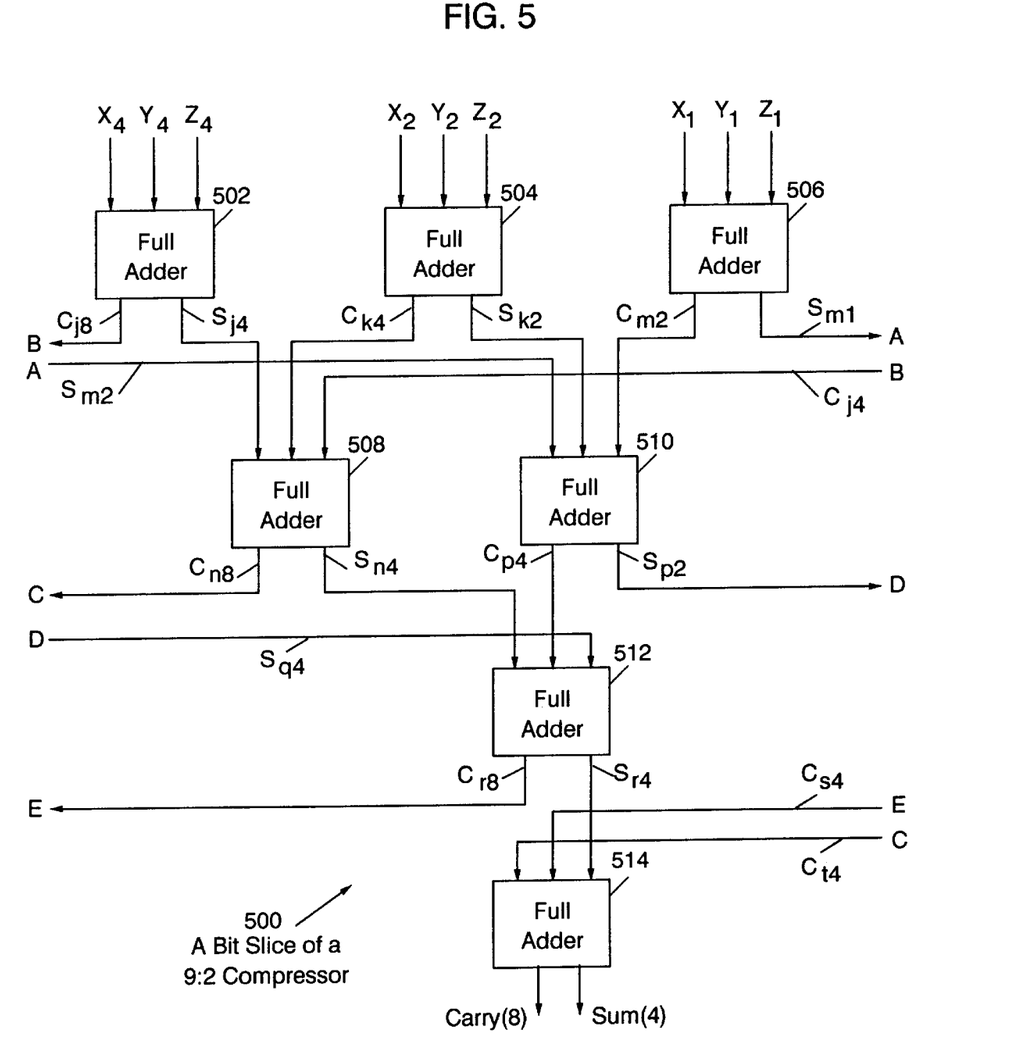
FIG. 5 illustrates, in block diagram form, a bit slice of the compressor of FIG. 4.

FIG. 5 illustrates a bit slice of a 9:2 compressor. Bit slice 500 comprises a full adder 502, a full adder 504, a full adder 506, a full adder 508, a full adder 510, a full adder 512, and a full adder 514. In bit slice 500, the following convention will be used to label the signals. When a signal has a label $K_l$, K indicates a signal name and "l" indicates a relative weight of the signal in a binary representation. Therefore, each of the signals, $X_4$, $Y_4$ and $Z_4$, provide a bit of information corresponding to a weight of "four" of each of the X, Y, and Z signals, respectively.

Each of the $X_4$, $Y_4$, and $Z_4$ signals are provided to full adder 502. Similarly, each of the $X_2$, $Y_2$, and $Z_2$ are provided to full adder 504. Furthermore, each of the $X_l$, $Y_l$, and $Z_l$ signals are provided to full adder 506. Full adder 502 is coupled to full adder 508 to provide an $S_{j4}$ signal. Additionally, full adder 504 is coupled to full adder 508 to provide a $C_{k4}$ signal. Full adder 504 is coupled to full adder 510 to provide an $S_{k2}$ signal. Full adder 506 is coupled to full adder 510 to provide a $C_{m2}$ signal. Full adder 506 provides an $S_{m1}$ signal to a next adjoining bit slice of a 9:2 compressor. Additionally, full adder 502 provides a $C_{j8}$ signal. Full adder 508 receives a $C_{j4}$ signal from an adjoining bit slice from a 9:2 compressor. Full adder 510 receives a $S_{m2}$ signal from an adjoining bit slice of a 9:2 compressor. Full adder 508 is coupled to full adder 512 to provide an $S_{n4}$ signal. Full adder 510 is coupled to full adder 512 to provide a $C_{p4}$ signal. Full adder 508 is provides a $C_{n8}$ signal to an adjoining bit slice of a 9:2 compressor. Full adder 512 receives an $S_{p4}$ signal from an adjoining bit slice of a 9:2 compressor. Full adder 512 is coupled to full adder 514 to provide an $S_{44}$ signal. Full adder 512 also provides a $C_{r8}$ signal. Full adder 514 receives a $C_{r4}$ signal and a $C_{n4}$ signal from an adjoining bit slice of a 9:2 compressor. Full adder 514 provides a carry value having a weight of 8 and a sum value having a weight of 4.

Figure 6:
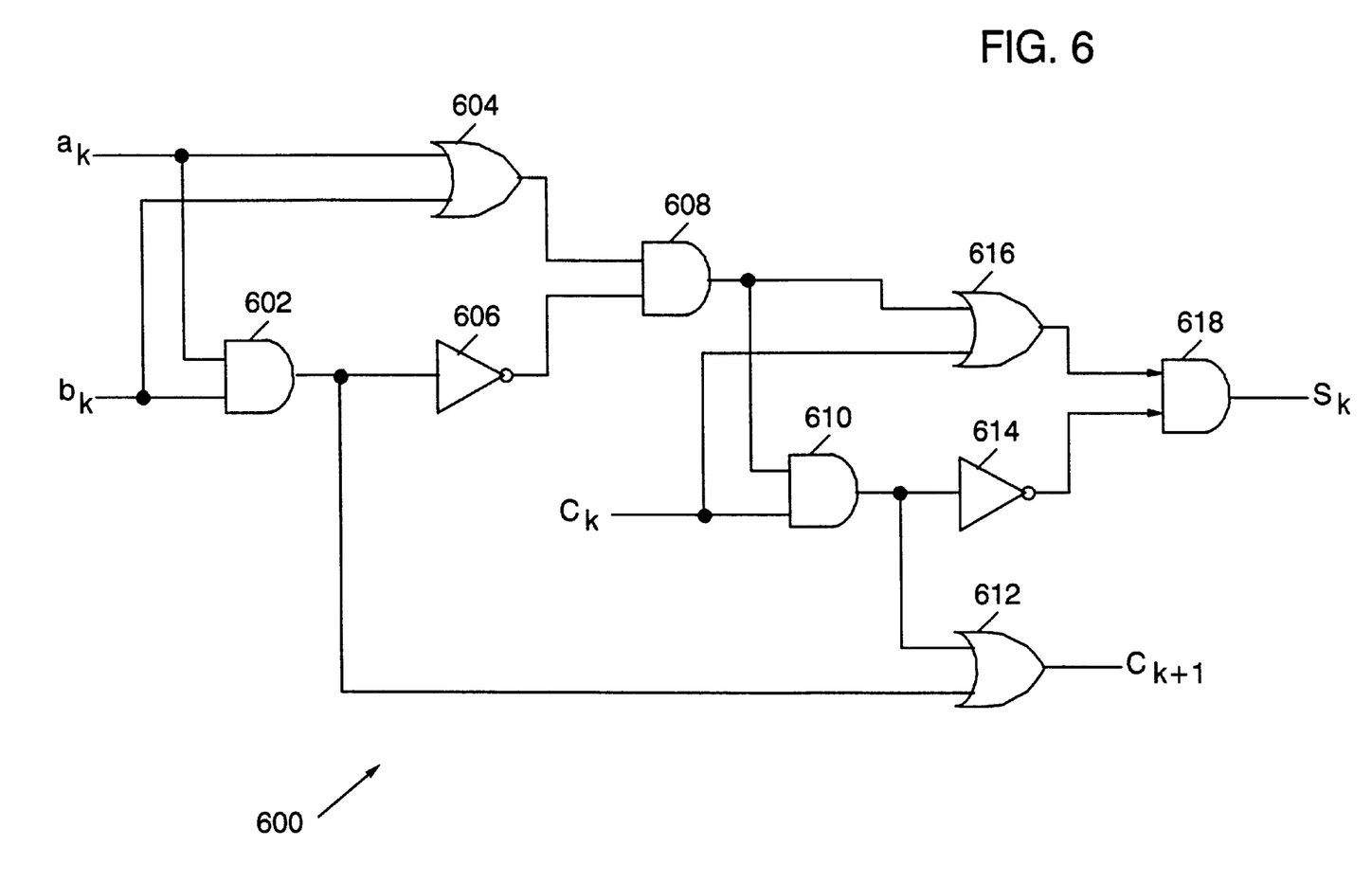
FIG. 6 illustrates, in block diagram form, one embodiment of a full adder of FIG. 5.

FIG. 6 illustrates one embodiment of a full adder which may be implemented in the present invention. Full adder 600 of FIG. 6 comprises an AND gate 602, an OR gate 604, an inverter 606, an AND gate 608, an AND gate 610, an OR gate 612, an inverter 614, an OR gate 616, and an AND gate 618. An $a_k$ input is provided to a first input of each of AND gate 602 and OR gate 604. A $b_k$ signal is provided to a second input of each of AND gate 602 and OR gate 604. An output of AND gate 602 is coupled to an input of inverter 606 and a first input of OR gate 612. An output of OR gate 604 is coupled to a first input of AND gate 608. An output of inverter 606 is coupled to a second input of AND gate 608. A $c_k$ signal is coupled to a first input of AND gate 610 and a first input of OR gate 616. An output of AND gate 608 is coupled to a second input of OR gate 616 and a second input of AND gate 610. An output of AND gate 610 is coupled to a second input of OR gate 612 and an input of inverter 614. An output of inverter 614 is coupled to a first input of AND gate 618. An output of OR gate 616 is coupled to a second input of AND gate 618. An output of AND gate 618 provides an $s_k$ signal. An output of OR gate 612 provides a $c_{k+1}$ signal.

Description of Operation

During operation of the multiplier of the present invention, an instruction which performs a multiplication operation must first be propagated in data processing system 100. When the instruction is decoded by instruction decode logic 118 and the appropriate signals are provided to sequencer 122 and control unit 120, multiplier 300 is enabled to perform a multiplication function on two data values. Assume in this embodiment of the invention that multiplier 300 is a Floating Point multiplier which is required to comply with IEEE standard IEEE-754 Floating Point specification. In this case, multiplier 300 is capable of multiplying two 53-bit inputs.

In a remaining portion of a description of operation of the present invention, FIG. 3 will be referenced. In FIG. 3, the two values to be multiplied are represented by the A and C values provided by Internal Data bus 134. Respective bits of each of the A and C data values are provided to one of buffer 302, buffer 304, and buffer 306. All 53 bits of the A value are buffered while only a portion of the C value is provided to a corresponding Booth-encoder to implement a Booth recoded multiplier. The data values placed in the buffers 302, 304, and 306, are subsequently encoded by a respective one of Booth encoder 308, 310, and 312 to generate 27 partial products which have 56 bits each. The encoded data values are used as select signals for a multiplexer and provided to a correct input of a corresponding one of compressor 320, 322, and 324. It should be noted that the encoding operation implemented by Booth encoders 308, 310, and 312 operates with both signed and unsigned numbers by padding a most significant bit with a 0 when an unsigned number is input. Next, Booth's encoding algorithm begins with an assumed 0 in a bit position to the right of a least significant bit. Therefore, in effect, a 55-bit number is encoded by each of Booth encoders 308, 310, and 312. Each of Booth encoders 308, 310, and 312 implements a modified Booth algorithm, wherein adjacent groups of 3-bits with one bit of each group overlapping the adjacent groups is evaluated. Such an encoding operation executed by a Booth encoder 308 results in 27 digits. By using this encoding technique, partial products for the multiplication operation are generated by a multiplying the A operand by an encoded C operand. Table 1 illustrates an example of a methodology implemented to encode an operand using Booth encoders 308, 310, and 312. The methodology illustrated in Table 1 is provided by way of example only and the present invention is not limited to the encoding scheme described therein.

TABLE 1

| $C_iC_{i+1}C_{i+2}$ | Recoded Digit | Active Select Line |
|---|---|---|
| 000 | 0 | sx0 |
| 001 | +1 | sx1p |
| 010 | +1 | sx1p |
| 011 | +2 | sx2p |
| 100 | −2 | sx2n |
| 101 | −1 | sx1n |
| 110 | −1 | sx1n |
| 111 | 0 | sx0 |

The signals "sx2p", "sx1p", "sx0", "sx1n", and "sx2n" correspond to five select signals generated by Booth encoders 308, 310, and 312 which control a value selected by one of multiplexers 314, 316, and 318.

After each row of the partial products has been multiplied by a properly encoded data value (c operand), each resulting row is a two's complement signed number. Therefore, a methodology must be developed to provide for sign extension of each row of the partial products. Such encoding operations are well-known to those with skill in the art and will not be described in greater detail herein. For more information, refer to "A Generalized Multibit Recoding of Two's Complement Binary numbers and Its Proof with Application in Multiplier Implementations," by Homayoon Sane, et al., published in *IEEE Transactions On Computers*, Vol. 39, No. 8, August 1990.

Given the values provided in Table 1, Boolean expressions for each of Booth encoders 308, 310, and 312 are provided below.

$$sx2p = \overline{C_i} \cdot C_{i+1} \cdot C_{i+2} \quad (1)$$

$$sx1p = \overline{C_i} \cdot C_{i+1} \cdot \overline{C_{i+2}} + \overline{C_i} \cdot \overline{C_{i+1}} \cdot C_{i+2} \quad (2)$$

$$sx0 = \overline{C_i} \cdot \overline{C_{i+1}} \cdot \overline{C_{i+2}} + C_i \cdot C_{i+1} \cdot C_{i+2} \quad (3)$$

$$sx1n = C_i \cdot \overline{C_{i+1}} \cdot C_{i+2} + C_i \cdot C_{i+1} \cdot \overline{C_{i+2}} \quad (4)$$

$$sx2n = C_i \cdot \overline{C_{i+1}} \cdot \overline{C_{i+2}} \quad (5)$$

The signals "sx2p", "sx1p", "sx0", "sx1n", and "sx2n" correspond to five select signals generated by Booth encoders 308, 310, and 312 which control a value selected by one of multiplexers 314, 316, and 318. These select signals are provided to a corresponding one of multiplexers 314, 316, and 318. Each of the multiplexers provides an output which corresponds to:

$$D=a_i \cdot sx1p + a_{i+1} \cdot sx2p + \bar{a}_i \cdot sx1n + \bar{a}_{i+1} \cdot sx2n \quad (6)$$

$$\overline{D}=\bar{a}_i \cdot sx1p + \bar{a}_{i+1} \cdot sx2p + a_i \cdot sx1n + a_{i+1} \cdot sx2n + sx0 \quad (7)$$

Please note that the equations provided for the Booth encoder and multiplexers of the present invention are based on an assumption that the Booth multiplexer is a dual rail multiplexer. It should be noted that alternate equations may be implemented when an alternate logic configuration is utilized. Such alternate logic configurations are well-known in the data processing art and will not be described in greater detail herein.

In configuring the buffers, encoders, and multiplexers of multiplier 300 of the present invention, it should be noted that a resulting circuit layout has a regular pattern and wastes less surface area of a data processor. In the present invention, the use of 9:2 compressors and, eventually, a 6:2 compressor, reduce an amount of interconnects between compressors in a multiplier and, therefore, improves the overall wirability of the multiplier.

The compressor implemented in the present invention is illustrated in greater detail in FIG. 5. As previously described, FIG. 5 provides a bit slice of a 9:2 compressor 500. It should be noted that the bit slice representation provided therein illustrates a single one of 53 bit slices of a 9:2 compressor. While a configuration of a bit slice of a 9:2 compressor 500 which is provided in accordance with the present invention has been set forth, the advantages of the configuration illustrated therein have yet to be described. Specifically, a relative weight of individual carry and sum values provided to the bit slice of the 9:2 compressor 500 vary, but each of the inputs to each of the full adders 502, 504, and 506 are still all of the same weight. Stated another way, each of the inputs to full adder 502 will have a relative weight of 4, while each of the inputs to full adder 504 will have a relative weight of 2. However, the inputs of the full adders of the bit slice of the 9:2 compressor 500 of the present invention are not constrained to be a same weight for each of the inputs provided to a first level of full adders 502, 504 and 506. By allowing inputs to subsequent levels of adders, such as full adder 508, 510, 512, and 514, to be varied relative weights and not requiring all inputs to be a same weight, the present invention implements a connectivity among each of the full adders of a 9:2 compressor in such a manner that a layout of a resulting compressor may be optimized for minimal surface area consumption. By configuring a bit slice of a 9:2 compressor 500 in this manner, a total number of inputs to the bit slice of the compressor is reduced from that required by traditional compressor implementation. Therefore, rather than 15 inputs and 8 outputs, a total number of inputs to a bit slice of a 9:2 compressor 500 is reduced to 14 and a total number of outputs therefrom is reduced to 7. This reduction reduces a total input/output count of bit slice of the 9:2 compressor 500 to twenty-one. The savings in the input/output counts occur because two interconnects which were once used to connect two adjacent compressors can be wired as a single interconnect which is internal to the bit slice of the 9:2 compressor 500. This reduction in a number of inputs results in a savings of one global wire for a single-rail logic design and two global wires for a dual-rail logic design. In some systems, a dual-rail design is required as they are unable to safely generate logical negation and, therefore, must generate both true and complement logic circuits to be able to implement some logic functions. Furthermore, the three input exclusive-OR circuit which forms a sum logic value for a full adder which is implemented in each of the bit slices of the 9.2 compressor is typically a dual-rail logic circuit and, therefore, two global wires may be conserved.

Figure 7:
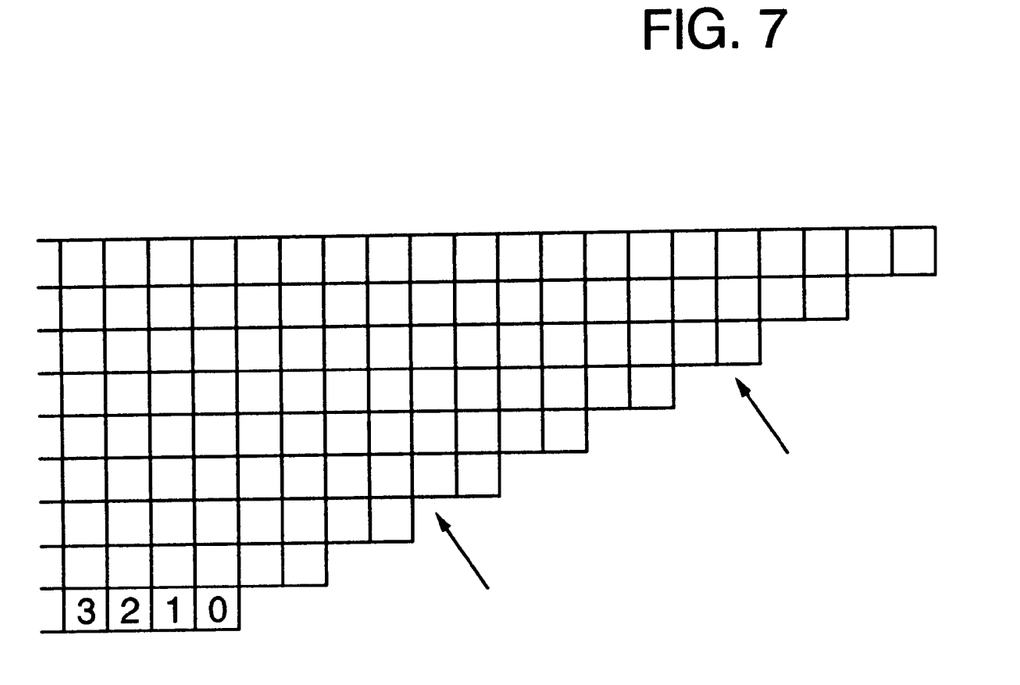
FIG. 7 illustrates, in dot notation, a Wallace tree multiplier implemented using a traditional methodology.
Figure 8:
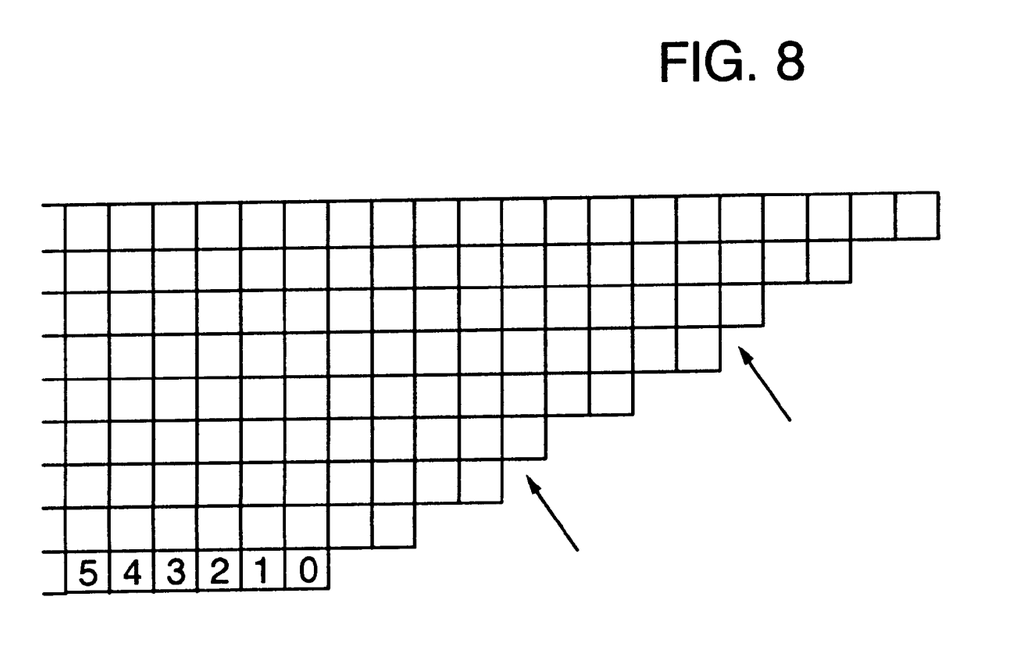
FIG. 8 illustrates, in dot notation, a Wallace tree multiplier implemented using one embodiment of the present invention.

Furthermore, when the bit slice of the 9:2 compressor is evaluated, a weight of each of the three sets of three inputs at the top should be noted. Because the inputs weight differ by a power of 2 for each group of inputs, the multiplexers implemented to provided inputs to the bit slice of the 9:2 compressor may be aligned to step over by a single bit position once every 3 multiplexer implementations, rather than a normal 2-bit step typically associated with prior art implementations of compressors. By stepping over a single bit position, a total area of the Wallace tree multiplier implemented by the present invention is reduced as the stagger in the edges of the multiplier tree are reduced. The area of the multiplier implemented using a traditional methodology is illustrated in FIG. 7. Conversely, the area of the tree multiplier implemented using the methodology of one embodiment of the present invention is illustrated in FIG. 8.

Figure 9:
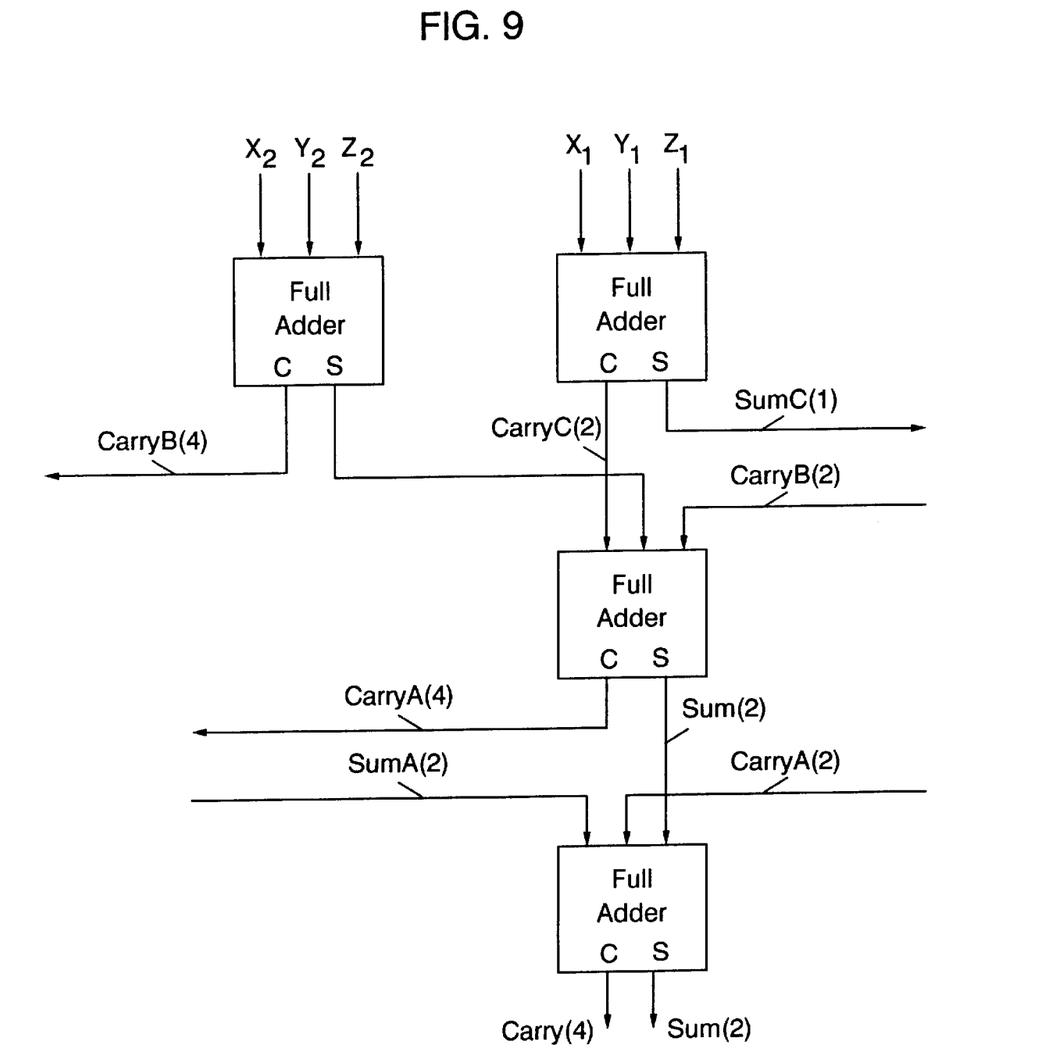
FIG. 9 illustrates, in block diagram form, a compressor in accordance with the present invention.

By now it should be apparent that there has been provided a compressor for use with a multiplier, as well as other circuits which reduces an amount of stagger and a number of interconnect wires between each of the bit slices of the compressor. The implementation of the invention described herein is provided by way of example only. Many other implementations may exist for executing the function described herein. For example, additional configurations of a compressor which is not restricted to having inputs of a same weight may be implemented to perform a logic function desired by a designer of such a circuit. For example, FIG. 9 illustrates an example of a 6:2 compressor which has been implemented in accordance with one embodiment of the present invention.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A compressor, comprising:
   a first circuit for receiving a first plurality of bits having a first binary weight and for providing a first sum value having the first binary weight and a first carry value having a second binary weight;
   a second circuit for receiving a second plurality of bits having the second binary weight and for providing a second sum value having the second binary weight and a second carry value having a third binary weight; and
   a third circuit coupled to the first circuit for receiving the first carry value and coupled to the second circuit for receiving the second sum value, the third circuit providing a third sum value having the second binary weight and for providing a third carry value having the third binary weight.

2. The compressor of claim 1, wherein the third circuit receives a first one of a third plurality of bits having the second binary weight.

3. The compressor of claim 2, further comprising:
   a fourth circuit coupled to the third circuit for receiving the third sum value, the fourth circuit receiving a second one of the third plurality of bits having the second binary weight and a first one of a fourth plurality of bits having the second binary weight, the fourth circuit providing a fourth sum value having the second binary weight and a fourth carry value having the third binary weight.

4. The compressor of claim 3 wherein each of the first circuit, the second circuit, the third circuit, and the fourth circuit comprises a counter circuit.

5. The compressor of claim 2, further comprising:
   a fourth circuit for receiving a fourth plurality of bits having the third binary weight and for providing a fourth sum value having the third binary weight and a fourth carry value having a fourth binary weight;
   a fifth circuit coupled to the second circuit for receiving the second carry value and coupled to the fourth circuit for receiving the fourth sum value, the fifth circuit receiving a first one of a fifth plurality of bits having the third binary weight, the fifth circuit providing a fifth sum value having the third binary weight and a fifth carry value having the fourth binary weight;
   a sixth circuit coupled to the third circuit for receiving the third carry value and coupled to the fifth circuit for receiving the fifth sum value, the sixth circuit receiving a second one of the fifth plurality of bits having the third binary weight, the sixth circuit providing a sixth sum value having the third binary weight and a sixth carry value having the fourth binary weight; and
   a seventh circuit coupled to the sixth circuit for receiving the sixth sum value, the seventh circuit receiving a second one and a third one of the fifth plurality of bits having the third binary weight, the seventh circuit providing a seventh sum value having the third binary weight and a seventh carry value having the fourth binary weight.

6. The compressor of claim 5 wherein each of the first circuit, the second circuit, the third circuit, the fourth circuit, the fifth circuit, the sixth circuit, and the seventh circuit comprises a full adder circuit.

7. The compressor of claim 1 wherein the first binary weight indicates a relative bit position in a binary number.

8. The compressor of claim 1 wherein the first binary weight indicates a first bit position in a binary number, the second binary weight indicates a second bit position in the binary number, and the third binary weight indicates a third bit position in the binary number.

9. The compressor of claim 8 wherein the third bit position is a next higher bit position relative to the second bit position and the second bit position is the next higher bit position relative to the first bit position.

10. A data processing system having a multiplier, wherein the multiplier comprises:
    a first booth encoder for receiving a first portion of a first data value and providing a first encoded data value;
    a first multiplexer receives a second data value and is coupled to the first booth encoder for receiving the first encoded data value, the first multiplexer providing a first multiplexed value;
    a first compressor coupled to the first multiplexer for receiving the first multiplexed value and for providing a first final sum value and a first final carry value, wherein the first compressor comprises a plurality of bit slices and each of the plurality of bit slices comprises:
    a first circuit for receiving a first plurality of bits having a first binary weight and for providing a first sum value having the first binary weight and a first carry value having a second binary weight;
    a second circuit for receiving a second plurality of bits having the second binary weight and for providing a second sum value having the second binary weight and a second carry value having a third binary weight; and
    a third circuit coupled to the first circuit for receiving the first carry value and coupled to the second circuit for receiving the second sum value, the third circuit providing a third sum value having the second binary weight and providing a third carry value having the third binary weight.

11. The multiplier of claim 10 wherein the third circuit receives a first one of a third plurality of bits having the second binary weight.

12. The multiplier of claim 11, wherein the plurality of bit slices further comprises:
    a fourth circuit for receiving a fourth plurality of bits having the third binary weight and for providing a fourth sum value having the third binary weight and a fourth carry value having a fourth binary weight;

a fifth circuit coupled to the second circuit for receiving the second carry value and coupled to the fourth circuit for receiving the fourth sum value, the fifth circuit receiving a first one of a fifth plurality of bits having the third binary weight, the fifth circuit providing a fifth sum value having the third binary weight and a fifth carry value having the fourth binary weight;

a sixth circuit coupled to the third circuit for receiving the third carry value and coupled to the fifth circuit for receiving the fifth sum value, the sixth circuit receiving a second one of the fifth plurality of bits having the third binary weight, the sixth circuit providing a sixth sum value having the third binary weight and a sixth carry value having the fourth binary weight; and a seventh circuit coupled to the sixth circuit for receiving the sixth sum value, the seventh circuit receiving a second one and a third one of the fifth plurality of bits having the third binary weight, the seventh circuit providing the first final sum value having the third binary weight and the first final carry value having the fourth binary weight.

13. The multiplier of claim 12 wherein each of the first circuit, the second circuit, the third circuit, the fourth circuit, the fifth circuit, the sixth circuit, and the seventh circuit comprises a counter circuit.

14. The multiplier of claim 12 wherein each of the third plurality of bits is provided by a next higher, adjacent one of the plurality of bit slices.

15. The multiplier of claim 14 wherein the fourth carry value, the fifth carry value, and the sixth carry value are provided to the next higher, adjacent one of the plurality of bit slices.

16. The multiplier of claim 12 wherein each of the fifth plurality of bits provided by a next lower, adjacent one of the plurality of bit slices.

17. The multiplier of claim 16 wherein the first sum value and the third sum value are provided to the next lower, adjacent one of the plurality of bit slices.

18. The multiplier of claim 12, further comprising:

a second booth encoder for receiving a second portion of the first data value and providing a second encoded data value;

a second multiplexer coupled to the second booth encoder for receiving the second encoded data value and the second multiplexer receiving the second data value, the second multiplexer providing a second multiplexed value;

a second compressor coupled to the second multiplexer for receiving the second multiplexed value and for providing a second final sum value and a second final carry value;

a third booth encoder for receiving a third portion of the first data value and providing a third encoded data value;

a third multiplexer coupled to the third booth encoder for receiving the third encoded data value and the third multiplexer receiving the second data value, the third multiplexer providing a third multiplexed value;

a third compressor coupled to the third multiplexer for receiving the third multiplexed value and for providing a third final sum value and a third final carry value; and a fourth compressor coupled to the first compressor for receiving the first final sum value and the first final carry value, coupled to the second compressor for receiving the second final sum value and the second final carry value, coupled to the third compressor for receiving the third final sum value and the third final carry value, the fourth compressor providing a fourth final sum value and a fourth final carry value.

19. A method for compressing a first data value, comprising the steps of:

receiving a first plurality of bits of the first data value at a first circuit, wherein each of the first plurality of bits has a first binary weight;

generating a first sum value having the first binary weight and a first carry value having a second binary weight using the first circuit;

receiving a second plurality of bits having the second binary weight at a second circuit;

generating a second sum value having the second binary weight and a second carry value having a third binary weight using the second circuit;

receiving the first carry value and the second sum value at a third circuit; and providing a third sum value having the second binary weight and a third carry value having the third binary weight using the third circuit.

20. The method of claim 19, further comprising the step of:

receiving a first one of a third plurality of bits having the second binary weight at the third circuit.

21. The method of claim 20, further comprising the steps of:

receiving the third sum value, a second one of the third plurality of bits having the second binary weight, and a first one of a fourth plurality of bits having the second binary weight at a fourth circuit; and providing a fourth sum value having the second binary weight and a fourth carry value having the third binary weight using the fourth circuit.

22. The method of claim 21 wherein each of the first circuit, the second circuit, the third circuit, and the fourth circuit comprises a counter circuit.

23. The method of claim 20, further comprising the steps of:

receiving a fourth plurality of bits having the third binary weight at a fourth circuit;

generating a fourth sum value having the third binary weight and a fourth carry value having a fourth binary weight using the fourth circuit;

receiving the second carry value, the fourth sum value, and a first one of a fifth plurality of bits having the third binary weight at a fifth circuit;

generating a fifth sum value having the third binary weight and a fifth carry value having the fourth binary weight using the fifth circuit;

receiving the third carry value, the fifth sum value, and a second one of the fifth plurality of bits having the third binary weight at a sixth circuit;

generating a sixth sum value having the third binary weight and a sixth carry value having the fourth binary weight using the sixth circuit;

receiving the sixth sum value and a second one and a third one of the fifth plurality of bits having the third binary weight at a seventh circuit; and generating a seventh sum value having the third binary weight and a seventh carry value having the fourth binary weight.

24. The method of claim 23 wherein each of the first circuit, the second circuit, the third circuit, the fourth circuit, the fifth circuit, the sixth circuit, and the seventh circuit comprises a counter circuit.

25. The method of claim 19 wherein the first binary weight indicates a relative bit position in a binary number.

26. The method of claim 19 wherein the first binary weight indicates a first bit position in a binary number, the second binary weight indicates a second bit position in the binary number, and the third binary weight indicates a third bit position in the binary number.

27. The method of claim 26 wherein the third bit position is a next higher bit position relative to the second bit position and the second bit position is the next higher bit position relative to the first bit position.

* * * * *